United States Patent [19]

Han

[11] Patent Number: 4,501,125

[45] Date of Patent: Feb. 26, 1985

[54] TEMPERATURE CONDITIONING SYSTEM STAGING CONTROL AND METHOD

[75] Inventor: Doyoung Han, La Crosse, Wis.

[73] Assignee: The Trane Company, La Crosse, Wis.

[21] Appl. No.: 557,983

[22] Filed: Dec. 5, 1983

[51] Int. Cl.³ ............................................... F25B 7/00
[52] U.S. Cl. ................................. 62/175; 236/1 FA; 307/39; 364/163
[58] Field of Search ................. 236/46 R, 1 E, 1 A, 236/1 ER, 78 D; 165/12; 62/231, 233, 175; 364/163, 166, 162, 557, 505; 307/39

[56] References Cited

U.S. PATENT DOCUMENTS

| | | | |
|---|---|---|---|
| 4,265,299 | 5/1981 | Harish | 165/12 |
| 4,338,791 | 7/1982 | Stamp, Jr. et al. | 62/160 |
| 4,384,462 | 5/1983 | Overman et al. | 236/1 EA |

FOREIGN PATENT DOCUMENTS 2745638 12/1979 Fed. Rep. of Germany ... 236/1 EA

OTHER PUBLICATIONS

Process Instruments & Controls; Considine, 1957, TA 165.C65.

Primary Examiner—William E. Wayner
Attorney, Agent, or Firm—Ronald M. Anderson; Carl M. Lewis

[57] ABSTRACT

A control for a multi-stage heating and cooling system used to temperature conditioning a comfort zone. The control includes a microprocessor responsive to a temperature sensor installed in the comfort zone. Heating and cooling setpoints and a lookup table including a plurality of ranges for deviation of the comfort zone from the setpoint temperature and associated limits for the rate of change of the comfort zone temperature used in determining specific staging control actions are stored in solid state memory accessed by the microprocessor.

The stages of temperature conditioning are controlled as a function of both the deviation of the zone temperature from the heating or cooling setpoint (depending on the system operating mode), and the rate of change of zone temperature. The mode of operation, i.e., heating or cooling, is determined by the relative values of the zone temperature and the heating and cooling setpoint.

15 Claims, 5 Drawing Figures

TEMPERATURE CONDITIONING SYSTEM STAGING CONTROL AND METHOD

TECHNICAL FIELD

This invention generally pertains to a control for a temperature conditioning system, and specifically, to a control for a multi-stage heating and cooling system.

BACKGROUND ART

A bi-metallic thermostat for a single stage heating system usually includes a wire wound resistive element called an anticipator. The anticipator is heated by current that flows through the resistor when the zone heating device is energized. Its purpose is to cause the bi-metalic strip actuated switch to de-energize the zone heating system sooner than it otherwise would under the influence of zone temperature, thereby minimizing setpoint overshoot.

In a multi-stage temperature conditioning system, a conventional thermostat control might comprise a plurality of such single stage bi-metallic switches, with a predetermined mechanical offset between the setpoint temperatures at which each stage is energized by the control. Controls for multi-stage systems with heating and cooling capability are even more complex, often with separate anticipation means for each stage in the heating and cooling modes of operation. As an alternative to these electromechanical multi-stage devices, solid-state controls incorporating both analog and digital electronic circuits have been developed, that offer greater control flexibility. Particularly, in microprocessor based controls, parameters such as hysteresis and dead-band may be implemented in software and easily modified for adaptation of the control to a specific installation. The control can be programmed to respond to variables determined by the characteristics of the multi-stage system and the building in which it is installed. One such variable is the rate of change of the zone temperature. Examples of multi-stage controls using the rate of change of zone temperature are described in U.S. Pat. Nos. 4,265,299 and 4,338,791.

The '299 patent discloses an analog control for a heat pump system that initiates supplemental electric heat following a setpoint increase only if the rate of zone temperature change is below a predetermined value. This avoids the use of relatively expensive electric resistance heating to recover from a setback temperature if the system can reach setpoint in a reasonable time using only the heat pump capacity. A more comprehensive control is disclosed in the '791 patent. It uses a microprocessor programmed with user inserted temperature setpoints, and responds to the actual room temperature and rate of change of room temperature in controlling the operating state of the system. A higher energy consumption operating state is enabled only when a periodic check of the rate of zone temperature change indicates that the desired temperature will not be achieved in a selected time period; however, rate of change is not used to determine if a lower energy consumption stage is desirable, for purposes of de-energizing one of the stages. Tracking the rate of zone temperature change allows the control to reach a setpoint temperature in a desired time interval, with minimal overshoot. The control thus does not require an anticipation means.

The control scheme of the '791 patent changes to a lower energy consumption operating stage in accordance with logic relating the deviation from setpoint to a specific predetermined change of state. In addition, the control is designed for use in a system with a specific number of operating states, with specific numbered states being associated with predetermined operating parameters, such as rate of zone temperature change and deviation of the zone temperature from setpoint. The control is thus not general in application, i.e., equally usable with systems having different numbers of operating states.

In consideration thereof, it is an object of this invention to provide a control for a multi-stage temperature conditioning that is general in application to different systems comprising various numbers and kinds of temperature conditioning stages.

A further object is to eliminate the need for anticipation means in the control, while minimizing overshoot of the zone setpoint.

A still further object of the invention is to selectively energize and de-energize stages of temperature conditioning as a function of the rate of change of zone temperature.

These and other objects of the invention will be apparent from the description of the preferred embodiment which follows hereinbelow and the attached drawings.

DISCLOSURE OF THE INVENTION

The subject invention is a control for a temperature conditioning system having a plurality of stages that may be selectively energized to meet a temperature conditioning demand in a zone, and a method for controlling such a system. The control includes a zone temperature sensor and means for selecting a zone setpoint temperature. Control means are connected to the temperature sensor and the setpoint selecting means and are responsive to them. Available to the control means are a plurality of predetermined ranges for the deviation of zone temperature from the setpoint, and for each range, limits on the rate of zone temperature change corresponding to a desired control action. The control means are operative to control the temperature conditioning stages as a function both of the particular range in which the deviation of the zone temperature from the setpoint temperature lies, and of the rate of change of the temperature in the zone as compared to the predefined limits associated with that range. Thus, the control means are able to selectively energize or de-energize one or more temperature conditioning stages to meet the demand in the zone.

The control means include a microprocessor with memory means for storing the setpoint and for storing a lookup table that contains the criteria for determining whether to energize or de-energize stages of temperature conditioning as a function of the deviation of the zone temperature from the setpoint and rate of change of the zone temperature. The microprocessor compares the actual deviation of the zone temperature from the setpoint to the ranges that are stored in the table, and then determines an appropriate control action by comparing the actual rate of change of the zone temperature to the plurality of limits associated with the selected range. These steps further comprise the method of control of the invention as claimed hereinbelow.

DESCRIPTION OF THE PREFERRED EMBODIMENT

Figure 1:
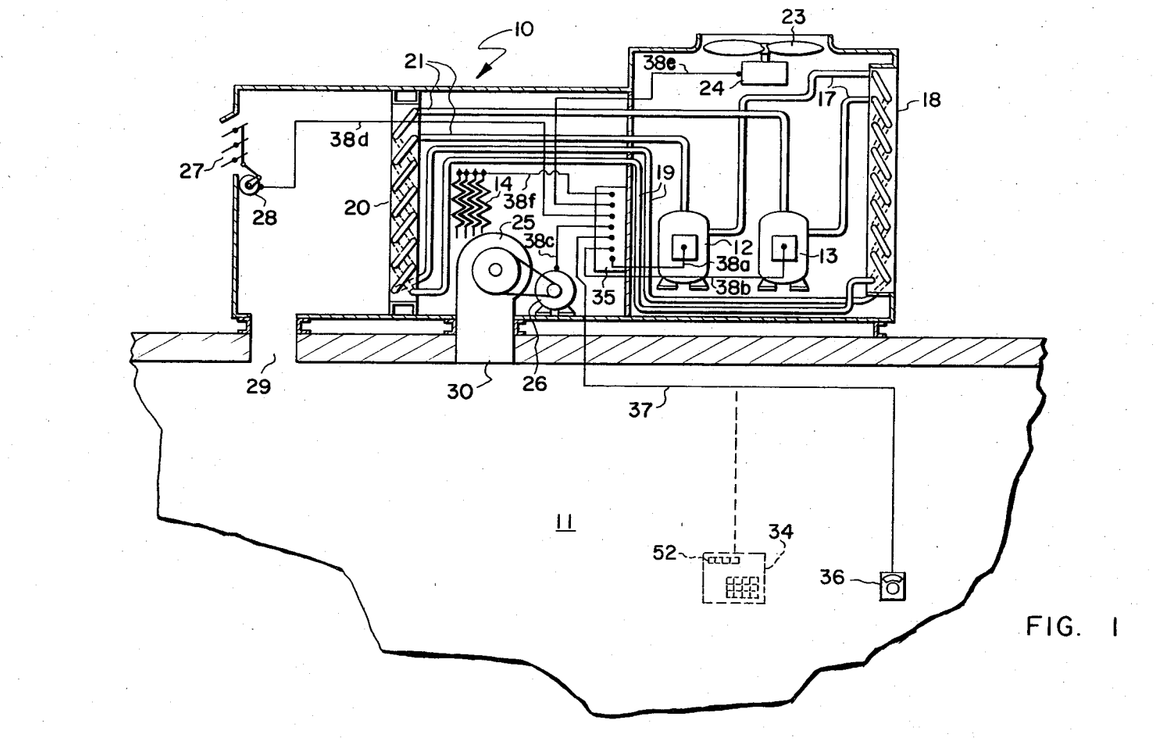
FIG. 1 is a schematic diagram showing a multi-stage temperature conditioning system for heating and cooling a zone, in which each stage is selectively controlled by the subject invention.

With reference to FIG. 1, a temperature conditioning system incorporating the control of the subject invention is generally denoted by reference numeral 10. Temperature conditioning system 10 is a multi-stage system installed as a rooftop unit for temperature conditioning a comfort zone 11. System 10 comprises a first two-stage compressor 12 and a second two-stage compressor 13; either compressor 12 or 13 may be selectively energized with one or both stages operative in a cooling mode to meet a temperature conditioning load. Thus, in the preferred embodiment, four stages of cooling are available.

Temperature conditioning system 10 may be operated selectively in a heating mode or a cooling mode as determined by the relative magnitude of the temperature in zone 11 and the heating and cooling setpoints for the zone, as will be explained hereinbelow. As shown in FIG. 1, in the cooling mode, refrigerant discharged by compressors 12 and 13 flows through refrigerant lines 17 to condenser 18. As the compressed refrigerant flows through condenser 18, it is placed in heat transfer relationship with cooler outdoor ambient air, thereby causing the compressed refrigerant to be condensed to a liquid. The liquid refrigerant flows through refrigerant lines 19 to evaporator 20, passing through an expansion device (not shown) along the way. The refrigerant is vaporized by heat transfer with air flowing into the comfort zone 11 as it expands in evaporator 20, and returns through refrigerant lines 21 to the suction side of compressors 12 and 13.

In the heating mode, each of four resistance heating elements 14 may be selectively energized to heat air flowing through evaporator 20 (which is then inactive as a heat exchanger). The air is heated as it passes over the heating elements 14 and into zone 11. Alternatively, heat might also be provided by a fossil fuel burners (not shown) having a plurality of stages. Electric resistance heating is shown in FIG. 1 as best illustrating the application of the invention to a multi-stage system. Temperature conditioning system 10 thus functions in a conventional manner to selectively heat or cool air supplied to comfort zone 11.

In order to achieve efficient heat transfer with outdoor ambient air, fan 23 driven by motor 24 pulls air through the condenser 18 and expels it through the top of the unit. Likewise, air is circulated through evaporator 20 and into comfort zone 11 by means of centrifugal fan 25 driven by electric motor 26.

An economizer damper 27 with actuator 28 is included to provide fresh outdoor air to meet minimum building ventilation requirements, and further, to provide low cost cooling of zone 11 by proportional use of outdoor ambient air when its temperature and humidity is acceptable. Air entering through economizer damper 27 mixes with return air coming from zone 11 through return air duct 29, and is discharged into zone 11 through supply air plenum 30.

A control box mounted within the enclosure of temperature conditioning system 10 is indicated by reference numeral 35. Mounted in zone 11 is a temperature sensor and means for establishing a zone setpoint 36. In the preferred embodiment, the setpoint means comprises an analog variable resistance control. The setpoint can also be input from a digital keypad/display 34 disposed in the zone, or from a building automation system that may include a separate external computer and keyboard. Electrical lines 37 connect the zone sensor/setpoint means 36 with control 35. Control leads 38a through f, connect the control 35 to each of the operating components in temperature conditioning system 10, including compressors 12 and 13, indoor fan motor 26, economizer actuator 28, outdoor fan motor 24, and heating elements 14, respectively. Leads 38 represent control lines for actuating relays or contactors (not shown) capable of handling the supply current to each of these components. These leads also include conductors that carry signals for indicating contactor operation, using auxiliary switches provided in the contactors. Details of the contactor mechanism and auxiliary switches are not shown since they are well known to those skilled in the art.

Figure 2:
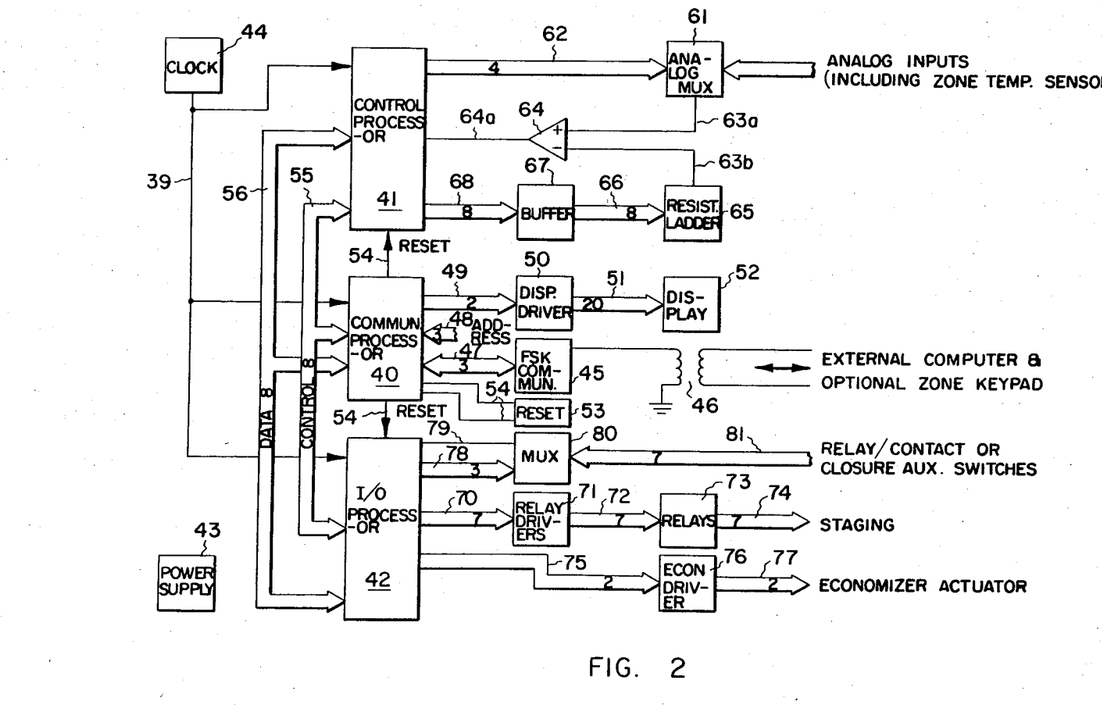
FIG. 2 is a block diagram illustrating the components comprising the multi-stage control.

Turning now to FIG. 2, a block diagram of the elements comprising the preferred embodiment of control 35 shows that it includes three microprocessors. Each microprocessor has a separate function, however it would also be possible to combine all control functions into a single microprocessor, given sufficient memory. Microprocessor 40 handles communications and operates as a master control over microprocessors 41 and 42. Processor 41 is labeled as a control processor since it functions to control the stages of temperature conditioning according to the control logic of the subject invention. Processor 42 is used for handling input and output of signals relative to the active elements of temperature conditioning system 10 via control leads 38. It also receives signals from the auxiliary switches in the contactors energized by control 35. Each microprocessor 40 through 42, and other active circuitry in control 35 is supplied with an appropriate DC voltage from DC power supply 43. These voltages comprise regulated levels of +5 and +10 VDC in the preferred embodiment. The processors are also linked via leads 39 to a master clock 44 which uses a quartz crystal as a time base to supply a common timing frequency to each processor.

Communications processor 40 is considered the master in the control scheme, since it is responsible for communications between the other two processors 41 and 42 and communication with an external building automation system computer (not shown). The external computer is interfaced to communications processor 40 through a frequency shift keying communications module 45, and a transformer 46 which provides both isolation and impedance matching to the transmission line. The frequency shift keying communications module 45 in combination with processor 40 modulates digital data supplied from the control 35 using two substantially different carrier frequencies to represent binary 1's and 0's, and demoualtes data from the external computer received at those two frequencies. A three conductor connection 47 between communications module 45 and microprocessor 40 serves to convey these signals bi-directionally. Leads 48 also provide a means for inputting an address from a digi-switch (not shown) or from jumpers that may be set (or cut) to identify a particular control 35, assuming that other devices are connected to the external computer via the data transmission lines. Microprocessor 40 is also connected by leads 49 to a display driver 50, which in turn is connected via leads 37 to display 52, co-located with zone sensor/setpoint means 36. A power-on reset module 53 is connected via leads 54 to communication processor 40 and to each of the processors 41 and 42. The purpose of the reset module 53 is to initialize the processors 40–42 whenever power is first energized to control 35.

Analog inputs, including the input from zone temperature sensor 36 on leads 37, are connected to an analog multiplexor 61. Multiplexor 61 responds to a signal from control processor 41 input via leads 62. This signal is an input select signal and is operative to cause the analog multiplexor 61 to pass a selected analog signal via lead 63a. The selected signal on leads 63a is connected to a noninverting input on comparator 64 for comparison to a voltage applied via leads 63b to the inverting input of comparator 64, derived from a resistance ladder network 65. The voltage on lead 63b is in turn controlled by signals output from control processor 41 over leads 68. These signals pass through a buffer 67, the output of which is connected to the ladder network 65 by leads 66. In effect, control processor 41 selects a successively lower voltage for input to comparator 64 by closing switches on resistor ladder network 65 until the output from comparator 64 indicates that the voltage level on input 63b is approximately equal to the voltage on the select analog input 63a. This technique for analog-to-digital conversion is well known to those skilled in the art as the R-2R conversion scheme, because of the magnitude of resistance values used in the ladder circuit.

Sensor 36 typically comprises a thermistor having a resistance proportional to the zone temperature. Assuming that control processor 41 has selected the analog input from the zone temperature sensor 36, it is thus able to determine the voltage drop across the sensor. By reference to the digital signal applied to resistor ladder 65 via control lines 68 and 66, processor 41 determines the digital equivalent for the analog voltage level that is proportional to the temperature in zone 11.

Microprocessors 40 through 42 communicate control signals bi-directionally over control leads 55, and pass data bi-directionally over data lines 66. This permits information that is available to any one of the microprocessors to be accessed by either of the other two. For example, each of the analog inputs reaching the multiplexor 61, when selected by control processor 41 and converted to a digital level, can be output to an external computer through communications processor 40 and FSK communication module 45. Likewise, if an external computer is used to enter data such as a zone setpoint temperature, that data can be made available to the control processor 41 by the communications processor 40. Digital display 52 can be used by the operator to read the zone temperature setpoint, the zone temperature, and other variables available to the control 35 and is located either on optional keypad setpoint means 34 or directly on control 35.

Once a control action such as a change in staging is adopted, signals passing over control lines 55 cause the input/output processor 42 to act on the data present on data lines 56, and to produce a corresponding logic level signal on lines 70. Lines 70 control relay drivers 71, the outputs of which are connected via leads 72 to the relays 73. Operation of relays 73 cause the contactors for the appropriate elements in the temperature conditioning system 10 to be energized or de-energized accordingly. The I/O processor 42 determines if a specific contactor has been actuated by feeding an input select signal over line 78 to multiplexor 80. The output from multiplexor 80 comprises the signal from the selected contactor auxiliary switch input to multiplexor 80 via leads 81.

The economizer actuator 28 is driven via logic level signals on lines 75 connected to an economizer driver 76. The higher current levels required by the economizer actuator 28 are sourced by economizer driver 75 and supplied over lines 77 to the actuator 28.

The functions performed by processors 40 through 42 are determined by a machine language program stored in internal read only memory (ROM) within each processor. In the preferred embodiment, all three microprocessors are NEC Model 8049 integrated circuits and each include 2K bytes of internal (ROM). These microprocessors also include 128 bytes of random access memory (RAM). Responsibility for energizing and de-energizing stages of temperature conditioning resides in a program stored in the ROM of control processor 41. Other functions performed by control 35 are also stored as programs in the ROM of processor 41, and it is by distributing the responsibility for communications and input/output to processors 40 and 42, that control processor 41 is freed to perform these other functions. As noted above, the control functions of the subject invention may also be carried out in a single microprocessor or by using other combinations of microprocessors with similar characteristics.

Figure 3:
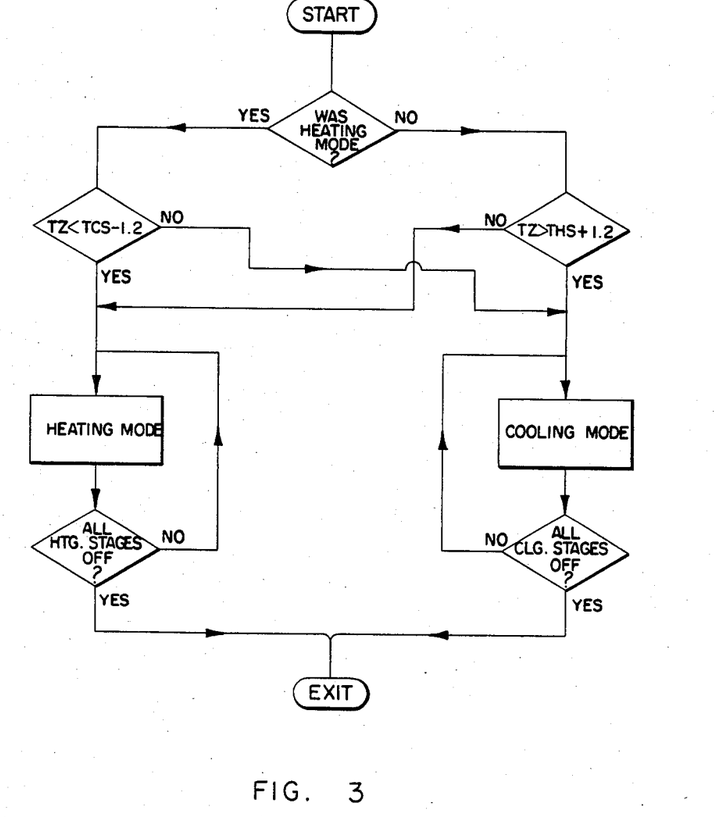
FIG. 3 is a flow chart showing the control logic by which the control determines whether to operate the temperature conditioning system in a heating or a cooling mode.
Figure 4:
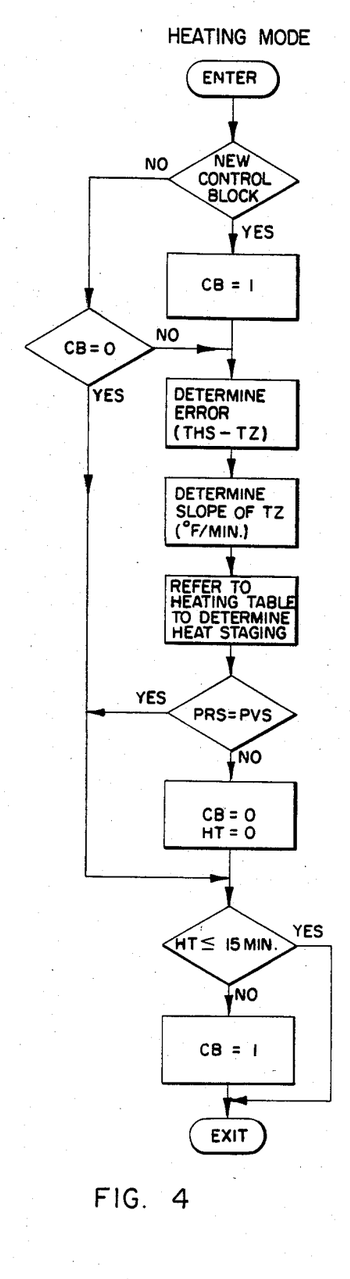
FIG. 4 is a flow chart showing the control logic for staging in the heating mode.
Figure 5:
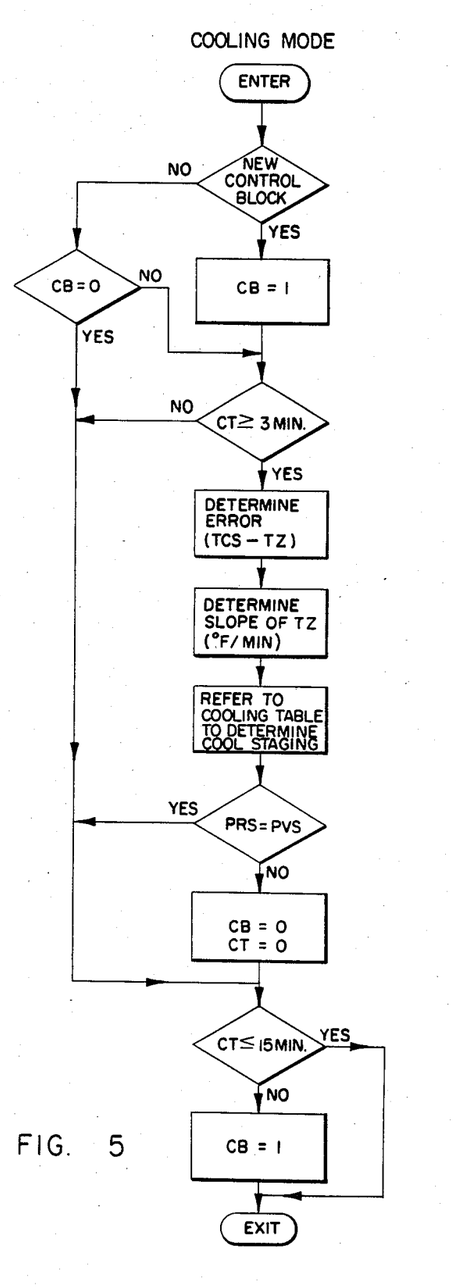
FIG. 5 is a flow chart illustrating the control logic for staging in the cooling mode.

The control logic for carrying out the subject invention as implemented by the program stored in control processor 41 is shown in FIGS. 3–5. FIG. 3 shows how the control 35 determines whether to operate the system in a heating or a cooling mode. The program first determines if the temperature conditioning system 10 is already operating in the heating mode and if it is, program logic branches to the left of the figure, where it inquries if the zone temperature TZ is less than the cooling setpoint TCS minus 1.2° F. Assuming that the system is already operating in the heating mode and that the zone temperature is more than 1.2° below the cooling setpoint, control 35 stays in the heating mode. Program logic next determines if all the heating stages have been de-energized, and if not, continues to execute the heating mode subroutine. Once all the heating stages are de-energized, the program exits to perform other functions.

While in the heating mode if the zone temperature rises until it equals or exceeds TCS-1.2° F., the logic shifts to the right of the flow chart, where it causes the system to enter the cooling mode. After entering the cooling mode, the system continues to execute the cooling subroutine until all coolers have been de-energized, at which point the logic exits the program.

If the system was initially not operating in the heating mode, the logic flow would be on the right side of the flow chart shown in FIG. 3, causing the program logic to inquire if the zone temperature (TZ) is more than 1.2° F. greater than the heating setpoint temperature (THS). If the answer to this inquiry is affirmative, the system 10 enters the cooling mode as noted previously. Otherwise, the heating mode is energized with logic flow moving to the left side of the flow chart in FIG. 3.

While in the cooling mode, temperature conditioning system 10 may be able to satisfy the temperature conditioning demand in zone 11 using fresh air supplied through economizer 27. During the heating mode, the economizer remains in its minimum open position. While in the cooling mode, the economizer damper 27 is controlled both as a function of the outdoor ambient air temperature and the zone temperature; however, details of the economizer control algorithm are not disclosed herein since they are not required for understanding the subject invention.

FIG. 4 illustrates the control logic for operation of the temperature conditioning system 10 in the heating mode. Once control 35 has energized system 10 in the heating mode, the program logic determines if a new "control block" has been entered. Control blocks are defined in Table I in terms of predetermined ranges for the deviation of the zone temperature from setpoint, and associated limits for the rate of temperature change that determine a specific change in staging. The program determines that a change to a new control block is appropriate if the deviation of zone temperature from setpoint shifts into a range defining a different control block. For example, if the heating setpoint temperature minus the zone temperature had equaled $-3.2°$ F., and subsequently changed to a new value of $-2.9°$ F., the program logic would shift from control block 1 to control block 2. Assuming that a change in the control block is not indicated, program logic determines if flag "CB" is set equal to 0, (indicating that a change in staging has occurred). If staging has been changed, a heating timer HT is also checked. If the present control block is the same as the previous control block for more than 15 minutes, CB is set equal to 1 before exiting the heating mode subroutine.

If on entry to the subroutine, the zone temperature deviation from setpoint has entered a new control block range, flag CB is set equal to 1 and program logic determines the deviation of the zone temperature from the heating setpoint. The same calculation is made if, as previously noted, the flag CB is not equal to 0 and the control block is not new. After the deviation of zone temperature from setpoint (THS−TZ) is determined, the program calculates the rate of change of zone temperature (or slope) in °F. per minute. To calculate slope of TZ, the change in zone temperature between successive readings is divided by the time between those readings as determined by an internal counter in control processor 41.

Stored within the read only memory of control processor 41 is a lookup table containing the data shown in Table I (and Table II) for deviation of temperature from setpoint and for rate of change of the zone temperature, along with the appropriate control action to be taken as a function of those parameters. Control logic compares the values determined for the deviation of the zone temperature from heating setpoint and the associated rate of change of zone temperature as shown in Table I, and either energizes one or two stages, makes no change in the number of stages energized, or de-energizes one or two stages. If the number of stages energized remains the same, program logic exits from the heating mode subroutine. On the other hand, if there has been a change in staging, flag CB and timer HT are set equal to 0. Setting flag CB to 0 assures that once the staging conditions have been changed in a control block, there will be no further change in staging until the deviation of zone temperature from the heating setpoint has caused a shift to a different control block range, or until 15 minutes have elapsed.

TABLE I

| Control Block | Heating Stage Control Action | | |
|---|---|---|---|
| | Deviation of Zone Temp. From Setpoint* | Rate of Zone Temp. Change | Stage Change |
| 1 | $D < -3$ | — | Decrease Two Stages |
| 2 | $-3 \leq D < -1.2$ | $R < 0$ | No Change |
| | | $R \geq 0$ | Decrease One Stage |
| 3 | $-1.2 \leq D \leq 1.2$ | $R < -0.24$ | Increase One Stage |
| | | $-0.24 \leq R \leq 0.24$ | No Change |
| | | $R > 0.24$ | Decrease One Stage |
| 4 | $1.2 < D \leq 3$ | $R < 0$ | Increase One Stage |
| | | $0 \leq R \leq 1.2$ | No Change |
| | | $R > 1.2$ | Decrease One Stage |
| 5 | $3 < D \leq 5$ | $R < 0.48$ | Increase One Stage |
| | | $0.48 \leq R \leq 1.8$ | No Change |
| | | $R > 1.8$ | Decrease One Stage |
| 6 | $D > 5$ | — | Increase Two Stages |

*THS - TZ where THS = Heating Setpoint and TZ = Zone Temperature

TABLE II

| Control Block | Cooling Stage Control Action | | |
|---|---|---|---|
| | Deviation of Zone Temp. From Setpoint* | Rate of Zone Temp. Change | Stage Change |
| 1 | $D < -5$ | — | Increase Two Stages |
| 2 | $-5 \leq D < -3$ | $R < -1.8$ | Decrease One Stage |
| | | $-1.8 \leq R \leq -0.48$ | No Change |
| | | $R > -0.48$ | Increase One Stage |
| 3 | $-3 \leq D < -1.2$ | $R < -1.2$ | Decrease One Stage |
| | | $-1.2 \leq R \leq 0$ | No Change |
| | | $R > 0$ | Increase One Stage |
| 4 | $-1.2 \leq D \leq 1.2$ | $R < -0.24$ | Decrease One Stage |
| | | $-0.24 \leq R \leq 0.24$ | No Change |
| | | $R > 0.24$ | Increase One Stage |
| 5 | $1.2 < D \leq 3$ | $R < 0$ | Decrease One Stage |

TABLE II-continued

| Control Block | Cooling Stage Control Action | | |
|---|---|---|---|
| | Deviation of Zone Temp. From Setpoint* | Rate of Zone Temp. Change | Stage Change |
| 6 | D < 3 | R ≧ 0<br>— | No Change<br>Decrease Two Stages |

*TCS - TZ, Where TCS = Cooling Setpoint and TZ = Zone Temperature

As an example of the operation of the system in the heating mode, assume that the zone temperature is 1.5° less than the heating setpoint temperature THS—a range that falls in control block 4. Assume further, that two stages of heating have been energized previously and that the rate of change of zone temperature equals 0.5° F. per minute. At this slope in control block 4, there would be no change in staging. Now, assume that the temperature in the zone drops, so that it is 2.5° less than the heating setpoint temperature THS, (but still in control block 4). If the rate of change of zone temperature decreases until it is less than 0, control 35 will energize an additional stage of heating. Once this occurs, flag CB and timer HT are set equal to 0, preventing any further staging action until the zone temperature changes sufficiently to place the deviation from setpoint in a new control block range, or until 15 minutes have elapsed. With three stages of heating energized, it can be assumed that the zone temperature deviation from setpoint would decrease until it is less than 1.2° F., at which time the control logic would determine that a change should be made from control block 4 to control block 3. In control block 3, if the rate of change of zone temperature were between −0.24° and 0.24° F. per minute, the control would cause no further change in staging. However, if the rate of change of zone temperature should exceed 0.24°, the control 35 would de-energize one stage of heating. Thereafter, no further control action would be allowed unless or until the deviation from heating setpoint temperature THS−TZ causes a shift to a different control block, or 15 minutes elapse.

Operation in the cooling mode is generally similar to that described in the heating mode. Upon entering the cooling mode subroutine, the program logic inquires if a new control block has been entered, and if not, checks to see if the flag CB is equal to 0. An affirmative answer causes the logic to inquire if the cooling timer indicates that less than 15 minutes has elapsed since a cooling stage was energized or de-energized, and if so, exits the subroutine. The cooling timer is another internal counter within microprocessor 41. If the cooling timer indicates that more than 15 minutes has elapsed since a change in the cooling stage, control flag CB is set equal to 1 prior to exit from the subroutine.

Returning to the point of entry for the cooling mode subroutine, if a new control block has been entered, flag CB is set equal to 1 and a check is made to determine if the cooling timer indicates more than three minutes since the last change in cooling staging. If less than three minutes has elapsed, program logic drops through the next check of the cooling timer and exits the subroutine. Otherwise, the deviation of the zone temperature from the cooling setpoint is determined (TCS−TZ). Next the rate of change of the zone temperature is determined by dividing the difference between the present zone temperature and the previously measured zone temperature by the time between those measurements. Control logic uses these values and refers to a lookup table containing the criteria shown in Table II, to determine an appropriate control action.

Table II is used by the program logic in a manner analogous to the use of Table I as previously described. By reference to this lookup table, control 35 determines the appropriate staging control action. If there is no change in staging, the logic checks to see if at least 15 minutes has elapsed since the last change in staging, and if not, exits the subroutine. If more than 15 minutes has elapsed since the last staging change, flag CB is set equal to 1. Thus, in the cooling mode, after 15 minutes have elapsed, a change in cooling staging, as determined by the rate of change of zone temperature, may be repeated.

As an example of operation of the control in the cooling mode, assume that the deviation of zone temperature from setpoint temperature was −2° F., i.e, in control block 3 of Table II. If the slope were greater than 0, control logic would add an additional stage of cooling, and then following 15 minutes, assuming that the rate of change of zone temperature reached −1.5° per minute, the control logic would de-energize the stage of cooling.

The heating and cooling timers, HT and CT, comprise internal counters in control microprocessor 41. The requirement that the cooling timer exceed 3 minutes before a change in staging is allowed is used in addition to any hardware timers that may be incorporated in the compressors 12 and 13 to prevent their rapid cycling, which would result in early failure.

It should be pointed out that the control strategy implemented by heating mode and cooling mode subroutines in the subject invention is generally independent of the number of stages of heating and cooling available, and further, that the control decisions defined by Tables I and II do not relate to specific stages of temperature conditioning. This is an advantage, since the control logic can skip over one stage of temperature conditioning if it becomes inoperative, and use the next available operative stage. For example, if the second stage in compressor 12 becomes inoperative, the control logic will respond to that failure by energizing the next available stage of cooling (e.g., the first stage of compressor 13), as determined by the deviation of the zone temperature from the cooling setpoint and by the rate of change of the zone temperature. A staging decision is not tied to a specific stage. The control logic is general in application and can work equally well with a system having two stages of cooling or eight stages of cooling.

In the preferred embodiment, Tables I and II do not include limits for the rate of change of zone temperature for control blocks 1 and 6. It will be apparent, however, that the control action associated with the deviation from setpoint in these control blocks could be broken down by adding limits for rate of change of the zone temperature to provide greater resolution for control of staging at these extremes of zone temperature error. Furthermore, although the preferred embodiment of the subject invention described above is applied to a temperature conditioning system that uses refrigerant cooling and resistance heating, it could be used with a cooling-only system or a heating-only system, and might also be used with a heat pump system having resistance heating or fossil fuel auxiliary heating means. This would require an additional control algorithm for optimum economic operation to insure that high cost electric resistance or fossil fuel auxiliary heat were not used unnecessarily. These and other modifications to the preferred embodiment as disclosed hereinabove, will be readily apparent to those skilled in the art, and it should be understood that while the present invention has been described with respect to the preferred embodiment, such modifications lie within the scope of the present invention as defined in the claims which follow.

I claim:

1. A control for a temperature conditioning system having a plurality of stages that may be selectively energized to meet a temperature conditioning demand in a zone, said control comprising
   a. a temperature sensor disposed within the zone;
   b. means for selecting a zone setpoint temperature; and
   c. means responsive to the temperature sensor and the setpoint selecting means, for controlling the temperature conditioning stages as a function both of the deviation of the zone temperature from the setpoint temperature, and of the rate of change of the temperature in the zone, said control means including means for selectively energizing or de-energizing the stages of temperature conditioning depending upon the range in which the deviation of the zone temperature from the setpoint temperature lies, and predefined limits for the rate of change in the zone temperature that are associated with that range.

2. The control of claim 1 wherein the control means comprise a microprocessor with memory means for storing the setpoint, and for storing a lookup table that includes predefined ranges for the deviation of the zone temperature from the setpoint and predefined limits for the rate of change of the zone temperature associated with each range, both of which are used by the control means in determining whether to energize or de-energize one or more stages of temperature conditioning.

3. The control of claim 2 wherein the determination to energize or de-energize a stage of temperature conditioning depends first on the magnitude of zone temperature deviation from the setpoint compared to a plurality of ranges stored in the lookup table, and secondly, on the rate of change of zone temperature compared to limits in the lookup table.

4. The control of claim 1 wherein the temperature conditioning system includes both heating and cooling stages.

5. The control of claim 4 wherein both a heating and a cooling setpoint are selected using said selecting means, and wherein the control means are operative to effect operation of the system in one of a heating and a cooling modes as a function both of the zone temperature and of one of the heating and cooling setpoints.

6. The control of claim 5 wherein the system continues to operate in the heating mode, once that mode is effected, until the zone temperature attains a value that is less than a predetermined increment below the cooling setpoint, and to operate in the cooling mode, once that mode is effected, until the zone temperature attains a value that is more than a predetermined increment above the heating setpoint.

7. A control for a temperature conditioning system having a plurality of stages that may be selectively energized to meet a temperature conditioning demand within a zone, said control comprising
   a. a temperature sensor disposed within the zone and operative to sense its temperature;
   b. means for selecting a zone setpoint temperature; and
   c. means responsive to the temperature sensor and the setpoint temperature selector means, for controlling the temperature conditioning stages, said con-control means including microprocessor means for;
      i. determining the deviation of the zone temperature from the setpoint temperature; and
      ii. determining the rate of change of the zone temperature; and
      iii. selecting an appropriate range for the deviation of the zone temperature from setpoint, from a plurality of predefined ranges, by comparison to the deviation determined in (c) (i); and
      iv. dependent upon the rate of change of the zone temperature as compared to one or more limits associated with said appropriate range selected in (c) (iii), either: energizing one or more stages, or de-energizing one or more stages, or making no change in the number of stages of temperature conditioning that are energized.

8. The control of claim 7 wherein the microprocessor means include memory means for storing the setpoint temperature and the plurality of predefined ranges for the difference between the setpoint and the comfort zone temperatures, and for each range of deviation, the plurality of corresponding limits for the rate of change of the comfort zone temperature, where each limit for rate of change is associated with a predefined stage control action.

9. The control of claim 7 wherein the temperature conditioning system includes both heating and cooling stages.

10. The control of claim 9 wherein the means for selecting a setpoint are operative to select both a heating and a cooling setpoint, and wherein the microprocessor means are operative to selectively effect operation of the system in one of a heating and a cooling mode as a function both of the zone temperature and of the heating and cooling setpoints.

11. The control of claim 10 wherein the microprocessor means are operative to change from the heating to the cooling mode if the zone temperature attains a value that is less than a predetermined increment below the cooling setpoint, and to change from the cooling to the heating mode if the zone temperature attains a value that is more than a predetermined increment above the heating setpoint.

12. A method for controlling a temperature conditioning system having a plurality of stages that may be selectively energized to meet a temperature conditioning demand in a zone, said method comprising the steps of
   a. sensing the temperature in the zone;
   b. selecting a zone setpoint temperature;
   c. determining the deviation of the zone temperature from the setpoint temperature;
   d. determining the rate of change of the zone temperature;

e. comparing the deviation of the zone temperature from the setpoint temperature to a plurality of predefined ranges to determine an appropriate range in which said deviation lies; and f. dependent upon the rate of change of the zone temperature as compared to one or more limits associated with said appropriate range determined in (e), either:
   i. energizing one or more stages of temperature conditioning; or
   ii. de-energizing one or more stages; or
   iii. making no change in the number of stages that are energized.

13. The method of claim 12 wherein the steps of determining the deviation and rate of change of the zone temperature are effected using a microprocessor.

14. The method of claim 12 wherein the temperature conditioning system includes both heating and cooling stages, further comprising the step of effecting operation of the system in one of a heating mode and a cooling mode as a function of the difference between the zone temperature and one of a heating and a cooling setpoint.

15. The method of claim 14 further comprising the steps of changing from the heating to the cooling mode if the zone temperature attains a value that is less than a predetermined increment below the cooling setpoint; and changing from the cooling to the heating mode if the zone temperature attains a value that is more than a predetermined increment above the cooling setpoint.

* * * * *